United States Patent
Servant et al.

(10) Patent No.: US 11,428,199 B2
(45) Date of Patent: Aug. 30, 2022

(54) TURBOMACHINE MODULE FOR A VARIABLE PITCH BLADE PROPELLER AND TURBOMACHINE COMPRISING IT

(71) Applicant: SAFRAN AIRCRAFT ENGINES, Paris (FR)

(72) Inventors: Régis Eugène Henri Servant, Moissy-Cramayel (FR); Clément Cottet, Moissy-Cramayel (FR); Thierry Georges Paul Papin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 72 days.

(21) Appl. No.: 16/929,492

(22) Filed: Jul. 15, 2020

(65) Prior Publication Data

US 2021/0017949 A1 Jan. 21, 2021

(30) Foreign Application Priority Data

Jul. 15, 2019 (FR) ...................................... 1907942

(51) Int. Cl.
*F03B 3/14* (2006.01)
*F03B 11/00* (2006.01)
*F03B 15/00* (2006.01)

(52) U.S. Cl.
CPC ................ *F03B 3/145* (2013.01); *F03B 3/14* (2013.01); *F03B 11/008* (2013.01); *F03B 15/00* (2013.01)

(58) Field of Classification Search
None
See application file for complete search history.

(56) References Cited

U.S. PATENT DOCUMENTS 3,977,648 A * 8/1976 Sigmon ................. F15B 15/103
251/59
4,882,977 A * 11/1989 Himeno ................... F01B 9/04
92/5 R
(Continued)

FOREIGN PATENT DOCUMENTS

EP 3165452 A1 5/2017
FR 2937678 A1 4/2010
(Continued)

OTHER PUBLICATIONS

Rapport de Recherche/Opinion Écrite, mailed Mar. 4, 2020, issued in corresponding French Application No. 1907942, filed Jul. 15, 2020, 7 pages.

*Primary Examiner* — Michael Lebentritt
(74) *Attorney, Agent, or Firm* — Christensen O'Connor Johnson Kindness PLLC (57) ABSTRACT

A turbomachine module with a longitudinal axis, the module comprising: a rotary casing rotatable around the longitudinal axis and arranged to carry a propeller provided with a plurality of blades; a system for changing the pitch of the blades of the propeller comprising: a control, and a mechanism for varying the pitch of the blades of the propeller connecting these blades to the control, wherein the control comprises a rotary actuator comprising a control body and a reference body which is integral with the rotary casing, and wherein the mechanism for varying the pitch comprises a synchronization ring which is driven in rotation around the longitudinal axis by the control body and which is guided in rotation on the rotary casing, the synchronization ring being connected to the blades.

15 Claims, 9 Drawing Sheets

(56) References Cited

U.S. PATENT DOCUMENTS

| | | | | |
|---|---|---|---|---|
| 5,101,862 | A | * | 4/1992 | Leete ............... F15B 15/12 |
| | | | | 137/899 |
| 8,371,105 | B2 | | 2/2013 | Glynn et al. |
| 2010/0104438 | A1 | | 4/2010 | Charier et al. |
| 2012/0099987 | A1 | * | 4/2012 | Belmonte ............ B64C 11/32 |
| | | | | 416/34 |
| 2013/0313949 | A1 | * | 11/2013 | Fujii .................. H02K 5/10 |
| | | | | 310/75 R |
| 2014/0023505 | A1 | * | 1/2014 | Curlier ............... F16L 21/00 |
| | | | | 416/159 |
| 2014/0205457 | A1 | * | 7/2014 | Curlier ............. F04D 29/323 |
| | | | | 416/160 |
| 2014/0355093 | A1 | * | 12/2014 | Goepel ................ H02N 2/10 |
| | | | | 359/221.2 |
| 2018/0334915 | A1 | | 11/2018 | Bordoni et al. |

FOREIGN PATENT DOCUMENTS

| | | | |
|---|---|---|---|
| FR | 3046405 | A1 | 7/2017 |
| FR | 3066472 | A1 | 11/2018 |

\* cited by examiner

TURBOMACHINE MODULE FOR A VARIABLE PITCH BLADE PROPELLER AND TURBOMACHINE COMPRISING IT

TECHNICAL FIELD

Embodiments of the disclosure relate to variable-pitch propellers of turbomachines, whether or not the rotor is ducted. They relate more particularly to the mechanisms for controlling the pitch of the blades of these propellers.

BACKGROUND

The background is illustrated by the documents EP-A1-3165452 and FR-A1-3046405, the disclosures of which are incorporated by reference in their entirety.

It is known to increase the dilution ratio of dual-flow engines, whether turboprop or non-ducted propeller type, to improve their propulsive efficiency and reduce their specific fuel consumption. This characteristic makes it possible to increase the dilution ratio of the engines, but it also has the disadvantage of working with reduced fan or propeller rotation speeds, reducing its compression ratio and thus generating aerodynamic instabilities, for example reducing pumping margins.

One solution to counter these instabilities is to use a variable pitch propeller. The mechanism for modifying the pitch thus becomes a major technological brick for these engines.

The propellers consisting of a fan vane on the turbojet engines or the propellers on open-rotor type turbomachines (with a non-ducted propeller) comprise a large number of blades. In addition, the system for modifying the pitch has to counteract large forces due to the size of the blades and the power transmitted. Also, the system must allow a large range of pitch angle variation between extreme operating positions.

In addition to systems using individual actuators per blade, which present problems of integration, power supply to the actuators and complexity of adjustment, there are various systems known which use a synchronization ring to change the pitch of an annular row of vanes or blades in one block. For example, the document FR-A1-2937678 describes a system using a rotary ring driven by cylinders in a plane transverse to the longitudinal axis and the document FR-A1-2997724 describes a system using a ring driven in axial translation by a longitudinal cylinder. Both of these French patent documents are expressly incorporated by reference in their entirety.

The known systems cause problems of size, complexity, and regarding the control or delivery of power to individual actuators at various levels, especially in the case of hydraulic actuators.

The disclosure is intended to address the problems of spatial integration of the hub of the propeller, the delivery of power to one or more actuators, and to allow precise adjustment of the pitch of the blades and/or a compensation for possible manufacturing clearances.

A second objective is, for example, to minimize the impact of the installation of a pitch change mechanism on the modularity of the engine and its maintenance.

SUMMARY

The disclosure relates to examples of a turbomachine module with a longitudinal axis. The module comprises:

a rotary casing rotatable around the longitudinal axis and arranged to carry a propeller provided with a plurality of blades; and a system for changing the pitch of the blades of the propeller comprising:
 a control or other means for controlling, and
 a mechanism for varying the pitch of the blades of the propeller connecting these blades to the control means, In an embodiment, the control means comprises a rotary actuator comprising a control body and a reference body which is integral with the rotary casing. In this or other embodiments, the mechanism for varying the pitch comprises a synchronization ring which is driven in rotation around the longitudinal axis by the control body and which is guided in rotation on the rotary casing by a guide or guiding means, the synchronization ring being intended to be connected to the blades, the rotary actuator being offset axially with respect to the synchronization ring.

Embodiments of the disclosure are remarkable in that the control means comprises a rotary actuator comprising a control body and a reference body which is integral with the rotary casing, and in that the mechanism for varying the pitch comprises a synchronization ring which is driven in rotation around the longitudinal axis by the control body and which is guided in rotation on the rotary casing by a guide or guiding means, the synchronization ring being intended to be connected to the blades, the rotary actuator being axially offset with respect to the synchronization ring.

The use of a synchronization ring makes it possible to change the pitch of the set of blades in a synchronized manner. If the pitch of each blade has been set during assembly, this ensures that the pitch of all the blades varies in the same way.

The fact that the synchronization ring is guided in rotation on the rotary casing allows the assembly comprising the rotary casing and the blade rotation mechanism to form a functional unit independent of the actuator for the holding function of its components. In addition, the connection between the ring and the casing contributes to the rigidity of the mechanism for precise blade positioning. This makes it easier to integrate this assembly into the propeller and to make it a module that can be adjusted independently to facilitate the assembly.

The control body of the rotary actuator rotates an output shaft of the actuator, preferably along the longitudinal axis. A single actuator can drive the synchronization ring.

The use of a rotary actuator also saves axial space compared to a linear actuator. The space inside the synchronization ring and/or the fact of shifting the actuator axially with respect to it makes it possible to have an actuator large enough to obtain the necessary power.

In some embodiments, the synchronization ring is at least partly surrounded by means for positioning the blades fixed to the rotary casing.

Thus, the assembly comprising the rotary casing and the mechanism for rotating the blades can be integrated under the hub of the propeller and occupy a reduced size.

Moreover, it can be decoupled from the actuator. This allows the assembly to form a sub-module which is assembled and adjusted independently before being mounted on the turbomachine. This increases the modularity of the turbo machine.

In some embodiments, the synchronization ring comprises a substantially cylindrical wall connected to at least a first frustoconical wall.

Advantageously, the first frustoconical wall is placed outside the cylindrical wall. This leaves a free space, radially outside the frustoconical wall, for placing a connection mechanism with the blades, under the hub of the propeller.

In some embodiments, connecting rods connect the first frustoconical wall to means for positioning the blades.

In order to allow precise adjustment of the blade-to-blade pitch, these connecting rods are preferably adjustable in length. This adjustment makes it possible to correct the blade-to-blade pitch dispersions caused by the geometrical defects of the parts. This correction makes it possible to limit the vibratory phenomena generated by the fan due to the dispersion of blade-to-blade pitch.

In some embodiments, the first frustoconical wall is at least partly axially disengaged from the hub. This allows access to the connecting rods to adjust them when the module is assembled.

Advantageously, the guide, such as the means for guiding in rotation the synchronization ring, comprises at least one rolling bearing interposed between the cylindrical wall and the rotary casing.

In some embodiments, the bearing is arranged so as to maintain the synchronization ring in a determined axial position with respect to the rotary casing. Advantageously, the bearing is placed axially substantially at the level of the blades of the propeller. This contributes to the compactness of the module at the hub of the propeller.

Advantageously, the cylindrical wall comprises a section for rotational coupling with the control body.

Advantageously, the synchronization ring is connected to a blade feathering module. It can be a second frustoconical wall dedicated to this function.

In some embodiments, the feathering module comprises an annular row of flyweights which are carried by the rotary casing, each being integral with a rotational axis parallel to the longitudinal axis and meshed with the synchronization ring.

The distribution of the flyweights in an annular row makes it possible to balance the system during the rotation of the propeller. The fact that the axes of the flyweights are parallel to the longitudinal axis means that they move in a transverse plane. The flyweights do not move in the longitudinal direction. This limits the transverse torques on the longitudinal axis and also limits the longitudinal dimensions of the module for integration into the turbomachine.

Advantageously, the rotational axes of rotation of the flyweights are connected to pinions that are meshed with an annular toothing radially external to the synchronization ring.

In some embodiments, the synchronization ring is connected to the blade feathering module via a frustoconical wall opposite the first frustoconical wall with respect to the substantially cylindrical wall. The frustoconical walls and the substantially cylindrical wall can at least partially accommodate the mechanism for varying the pitch.

Advantageously, the reference body is axially offset with respect to the synchronization ring.

The disclosure also relates to examples of an aircraft turbomachine, comprising at least one module as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
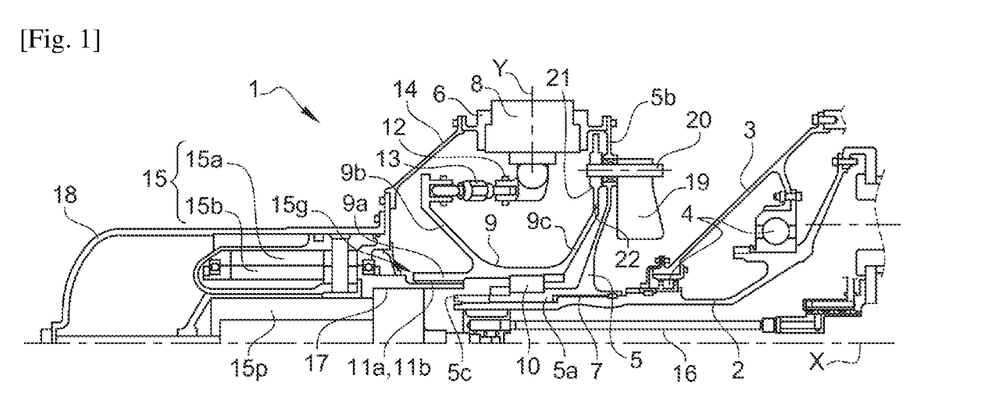
FIG. 1 shows a longitudinal half-section of a module according to an embodiment of the disclosure.
Figure 2:
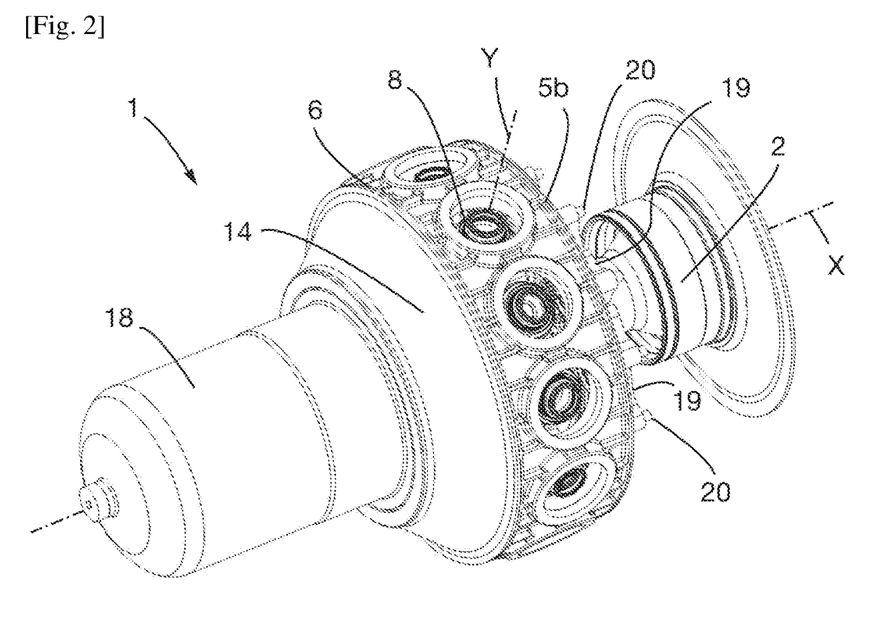
FIG. 2 shows a perspective view viewed from the front of the module in FIG. 1, without the fixed structure of the turbomachine.

FIGS. 1 and 2 present a general view of an embodiment of a module 1 of a turbomachine 23, 28 according to embodiments of the disclosure, driven in rotation around a longitudinal axis X by a shaft 2 coming out of the engine part, not shown. The shaft 2 is itself guided in rotation on a fixed casing 3 of the turbomachine by bearings 4. The propeller is positioned here in front of the engine.

The module 1 comprises a rotary casing 5, 6 rotatable around the longitudinal axis X and arranged to carry the propeller with a plurality of blades. In some embodiments, the propeller with a plurality of blades is carried by the casing 5, 6. The propeller can thus be integrated into the module 1.

The module 1 includes a trunnion 5, centred on the longitudinal axis X, which connects the shaft 2 to the hub 6 of the propeller, supporting the blades. The trunnion 5 comprises a substantially cylindrical central part 5a which is fitted to the shaft 2 by means of a spline connection 7, which allows the trunnion 5 to be mounted/dismounted from the front of the shaft 2. A nut 5c locks the trunnion 5 at the free end of the shaft 2.

In line with the spline connection 7, the trunnion 5 comprises a disc 5b connected to the hub 6. A bolted connection allows the centering and fixation of the hub 6 at the periphery of the disc 5b. The hub 6 is a structural part, in which the means 8 for positioning and holding the blades around radial axes Y are preinstalled. These means 8 for positioning the blades are not detailed, they comprise pivots, their rolling bearings and all the parts necessary for their assembly. The trunnion 5 and the hub 6 form a rotary casing connecting the blades of the propeller to the shaft 2 of the engine.

To create the mechanism for modifying the pitch, a synchronization ring 9 is mounted on the trunnion 5. The synchronization ring 9 comprises a substantially cylindrical tubular central part 9a, connected to a first frustoconical part 9b and a second frustoconical part 9c which extend radially outside the central part 9a.

The central part 9a supports connecting means 10 with the central part 5a of the trunnion 5 allowing the rotation of the synchronization ring 9 with respect to the trunnion 5. These connecting means 10 being formed here by a double row rolling bearing, preloaded, i.e. without axial clearance, so as not to be sensitive to the axial force which it supports, and greased for life. Two nuts fix the rolling bearing 10 to the trunnion 5 and to the synchronization ring 9.

The central part 9a of the synchronization wheel 9 extends axially on either side of the transverse plane of the axes Y of rotation of the blades. The rolling bearing 10, which connects to the trunnion 5, is located approximately at the level of the transverse plane of the axes Y.

The upstream end of the central part 9a of the synchronization ring 9 has a system of axial splines 11a arranged on its inner surface. Alternatively, these splines could be replaced by a conical toothing with angle transmission.

The first frustoconical part 9b flares forward and is located in front of the transverse plane of the axes Y. Its free end is axially clear with respect to the hub 6.

Figure 3:
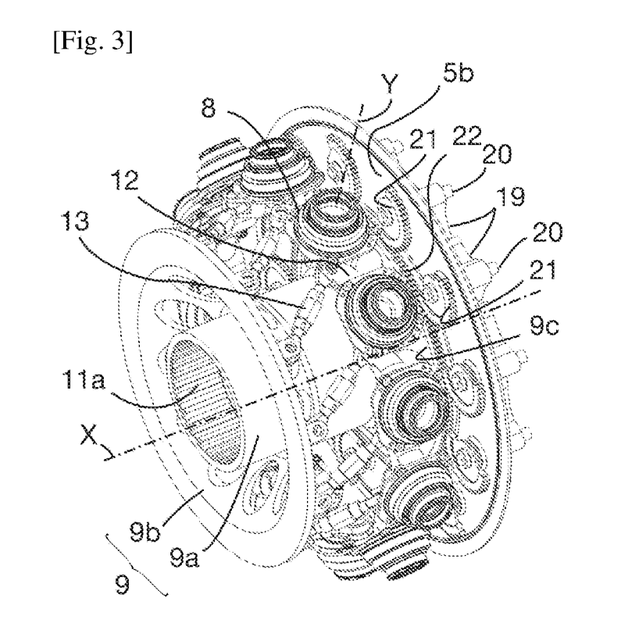
FIG. 3 shows a perspective view viewed from the front of the module shown in FIG. 2, without the front cowling and the hub to show the internal mechanism.
Figure 4:
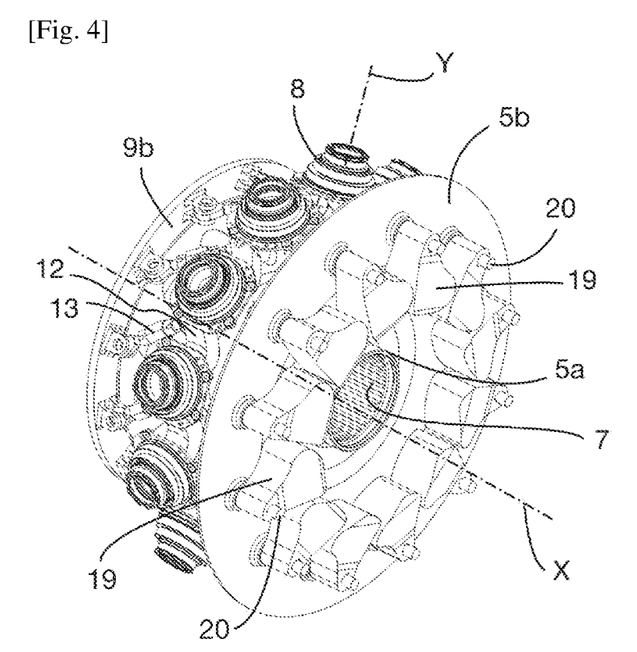
FIG. 4 shows a perspective view viewed from the rear of the same module as in FIG. 3.

To complete the mechanism for modifying the pitch, an eccentric 12 is connected to the positioning means 8 of each blade on its part opening towards the inside of the hub 6. Each of these eccentrics 12 is connected to the radially outer end of the first frustoconical part 9b of the synchronization ring 9 by means of a connecting rod 13 and bolts. FIGS. 3 and 4 provide a perspective view for a better understanding of the mechanism.

In order to allow precise adjustment of the blade-to-blade pitch, these connecting rods 13 are here adjustable in length. This adjustment allows the correction of blade-to-blade misalignment caused by geometrical defects of the parts.

The second frustoconical part 9c starts at the rear end of the central part 9a of the synchronization ring 9 and extends radially along the disc 5b of the trunnion 5. A detailed description of this second part will be given later in connection with the complementary feathering system. Advantageously, for the arrangement of the turbomachine, the frustoconical parts 9b, 9c and the central part 9a of the synchronization ring at least partially accommodate the mechanism for modifying the pitch, in particular its connecting rods 13 and eccentrics 12.

A frustoconical shroud 14 is fixed to the front of the hub 6 and covers the first frustoconical part 9b of the synchronization ring 9, as well as the connecting rods 13 of pitch blades. The assembly of the parts just described, rotating with the rotary casing formed by the hub 6 and the trunnion 5, forms a blade support sub-module with control of the pitch, the dimensions of which are reduced to a small volume at the hub 6 of the blades of the propeller. This sub-module is shown in full in FIG. 6.

A rotary actuator 15 centred on the axis X of the turbomachine is installed upstream of the shroud 14 and the synchronization ring 9. The rotary actuator 15 is axially offset with respect to the synchronization ring 9. The rotary actuator 15 is, for example, arranged upstream of the synchronization ring 9. This allows a larger actuator to be used to achieve high power. Here, it is a hydraulic actuator comprising a reference body 15a in which a piston 15p, which slides parallel to the axis X, is set in motion by a fluid. The reference body 15a is axially offset in relation to the synchronization ring 9. A fluid supply 16 from the rear of the shaft 2 of the engine, not detailed, controls the rotational movement of the piston 15p relative to the reference body 15a.

The reference body 15a associated with a cowling 18 of the rotary actuator 15 is attached to the shroud. It therefore rotates together with the trunnion 5 and the hub 6 about the longitudinal axis X. The rotary actuator 15 therefore drives the piston 15p in rotation relative to the trunnion 5 and the hub 6 via rollers 15g associated with the piston and engaging in corresponding curved tracks provided in the piston 15p and the reference body 15a in order to transform the sliding movement of the piston into the rotary movement of a shaft 17 forming part of a control body 15b. Such rollers 15g and tracks in a rotary actuator with a sliding piston are well known, such an actuator being commercially available and its operating principle being known for decades.

The piston 15p is connected to the shaft 17 centred on the axis X which has a series of splines 11b (or a conical toothing) cooperating with those 11a of the synchronization ring 9 to form a connection between the shaft 17 and the synchronization ring 9, securing them in rotation but allowing translation of one with respect to the other. The rotary actuator 15 and the synchronization ring 9 can therefore be uncoupled for assembly and/or maintenance.

The cowling 18, which is also attached to the frustoconical shroud 14, surrounds and isolates the actuator 15 from the outside.

The assembly forms a control or control module for the pitch angle of the blades of the propeller. The trunnion 5, the hub 6 of the propeller, and the reference body 15a of the actuator 15 form an assembly that rotates with the blades of the propeller at the speed imparted by the shaft 2 of the propeller. A rotation of the piston 15p in this rotating reference frame causes an equivalent rotation of the synchronization wheel 9 and a displacement transverse to the axes Y of the blades of the end of the connecting rods 13 fixed to the ring, which causes the latter to rotate by driving the eccentrics 12.

Figure 5:
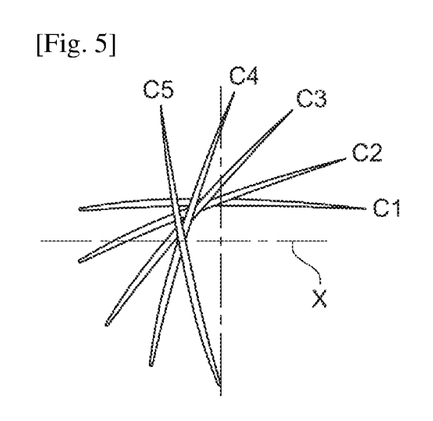
FIG. 5 shows schematically, in circumferential section, different pitch positions of the blades of a propeller using embodiments of the disclosure.

The kinematics of the assembly makes it possible to modify the pitch angle over a large angular range. FIG. 5 shows different angular positions of the blades for feathered operation modes C1, ascent C2, take-off C3, ground C4 and reverse thrust C5. The variation in pitch angle is greater than 90° between the extreme positions.

For safety reasons, it is preferable that the blade feathering can be done in the event of failure of the actuator 15. The control module described here includes a system to perform this operation, which can be seen in FIGS. 1, 3 and 4.

To this end, the disc 5b of the trunnion 5 supports an annular row of identical flyweights 19, placed behind the disc 5b and linked to rods 20 parallel to the axis X and passing through the disc 5b. The distribution of the flyweights 19 in a ring enables the propeller to be balanced in rotation. The flyweights 19 are configured in such a way as to be able to rotate each around the axis of the rods 20 between a first position radially below each rod and a second position radially outside the rod. Each flyweight 19 is asymmetrical and off-centre in azimuth with respect to the corresponding rod 20. In this way, when the propeller rotates, the centrifugal force on the flyweights tends to make all the weights 19 rotate in the same direction in order to make them pass from the first to the second position.

The rods 20 are mounted on the disc 5b so that they can rotate freely in the axial direction. They are therefore driven by the flyweights 19 as they rotate from the first to the second position. A toothed pinion 21 is connected to each rod 20 on the front of the disc 5b. In correspondence, the second frustoconical part 9c of the synchronization ring 9, described above, comprises on its periphery a toothed ring 22 which meshes with the toothed pinions 21.

The assembly is adjusted so that when the flyweights 19 are in the second position because of the centrifugal force, this corresponds to a rotational position of the synchronization ring 9 with respect to the hub 6 which controls the pitch of the blades for the feathering position C1. Advantageously, the first position of the flyweights 19, representing their extreme opposite displacement, may correspond to position C5, representing an extreme position of pitch of the blades opposite to feathering.

In addition, the flyweights are calibrated to provide sufficient torque to force feathering if the actuator 15 is faulty, while the actuator 15 has sufficient torque to counter the action of the flyweights 19 in normal operation.

Figure 6:
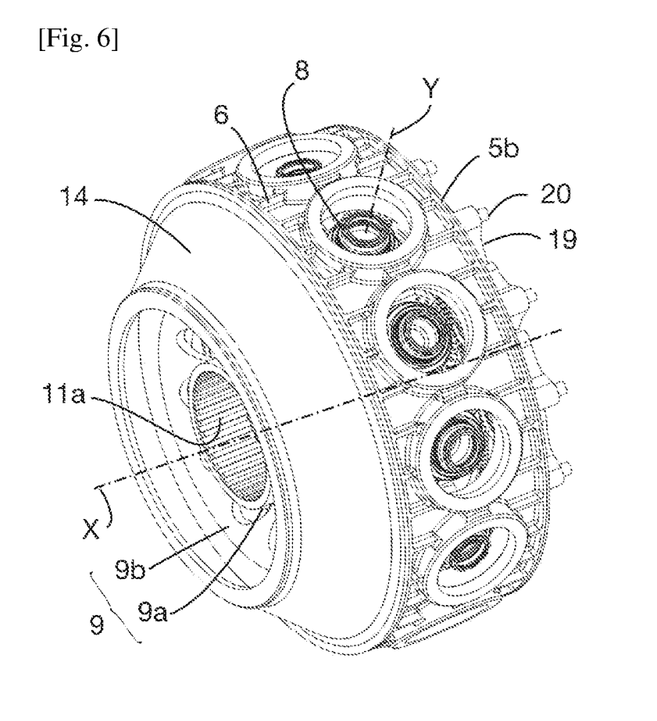
FIG. 6 shows a perspective view viewed from the front of the module A shown in FIG. 2.
Figure 7:
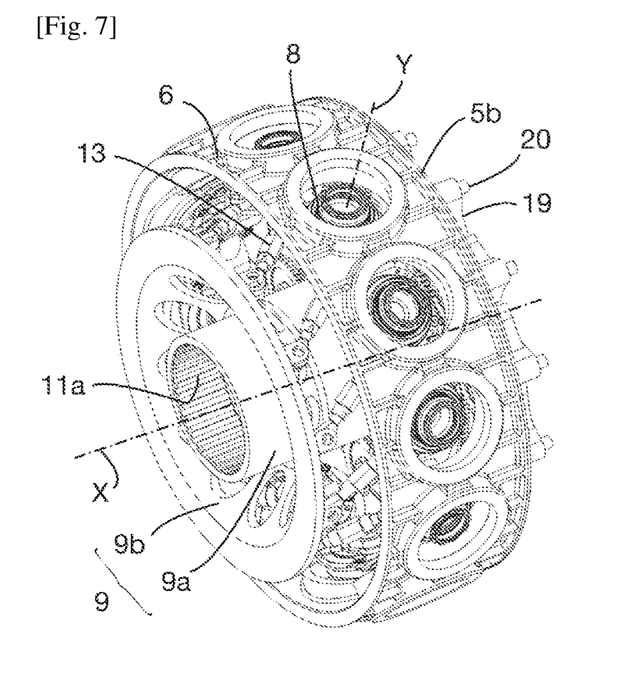
FIG. 7 shows a perspective view viewed from the front of the module A shown in FIG. 2, on which a front cowling has been removed.

FIGS. 6 and 7 illustrate additional properties of the described module. First of all, with reference to FIG. 6, the assembly consisting of the trunnion 5, the hub 6 with the means 8 for positioning the blades, the frustoconical shroud 14 and the synchronization ring 9 with the connecting rods 13 and the eccentrics 12, forms a support sub-module of the blades with pitch control, independent of the actuator 15. Indeed, the spline connection 11a on the ring 9 allows the front part to be removed with the actuator 15. On the one hand, this facilitates the assembly and maintenance of the system. On the other hand, other types of actuators than the one described here, e.g. electrical actuators, can be adapted to the sub-module.

In FIG. 7, the frustoconical shroud 14 has been removed from the sub-module, e.g. by unbolting it. In this case, the connecting rods 13 are accessible and their length can be adjusted to correct any possible misalignment between the blades.

Figure 8:
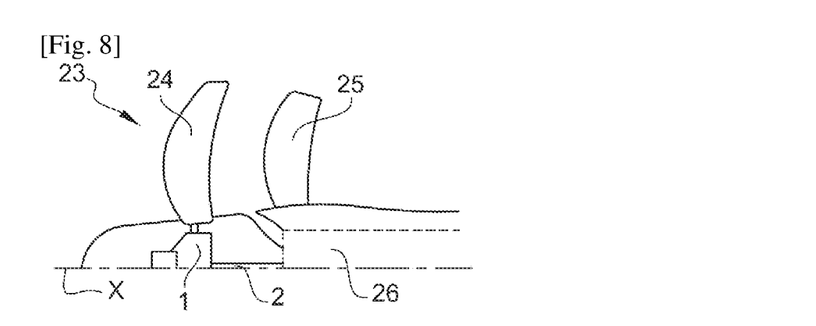
FIG. 8 shows a schematic longitudinal half-section of an open-rotor type turbomachine using the module shown in FIG. 1.
Figure 9:
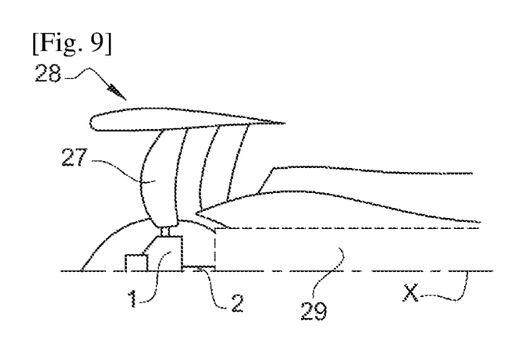
FIG. 9 shows a schematic longitudinal half-section of a ducted fan turbomachine using the module from FIG. 1.

The module described above can be installed, for example, on an open-rotor turbomachine 23. FIG. 8 thus shows the module 1 placed under the upstream propeller 24 of such a turbomachine 23, with a fixed blade ring 25 at the rear, straightening the flow through the propeller 24 and the engine 26 itself, not detailed, which drives the propeller 24 via the shaft 2. Similarly, with reference to FIG. 9, the module can be installed to drive the ducted fan 27 of a dual-flow turbomachine 28, whose engine 29 is not detailed.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A turbomachine module with a longitudinal axis, the module comprising:
   a rotary casing rotatable around the longitudinal axis and arranged to carry a propeller provided with a plurality of blades; and
   a system for changing the pitch of the blades of the propeller comprising:
   a control, and
   a variable pitch mechanism for varying the pitch of the blades of the propeller connecting these blades to the control,
   wherein said control comprises a rotary actuator comprising a control body and a reference body which is integral with said rotary casing, and wherein said variable pitch mechanism for varying the pitch comprises a synchronization ring which is driven in rotation around the longitudinal axis by said control body and which is guided in rotation on said rotary casing by a guide, said synchronization ring being intended to be connected to said blades, the rotary actuator being offset axially with respect to the synchronization ring.

2. The module according to claim 1, wherein the synchronization ring is at least partly surrounded by means for positioning said blades fixed to the rotary casing.

3. The module according to claim 1, wherein the synchronization ring comprises a substantially cylindrical wall connected to at least a first frustoconical wall.

4. The module according to claim 3, wherein connecting rods connect said first frustoconical wall to means for positioning said blades.

5. The module according to claim 3, wherein the guide for guiding in rotation the synchronization ring comprises at least one rolling bearing interposed between said cylindrical wall and said rotary casing.

6. The module according to claim 3, wherein said cylindrical wall comprises a section for rotational coupling with said control body.

7. The module according to claim 1, wherein the synchronization ring is connected to a blade feathering module.

8. The module according to claim 7, wherein the feathering module comprises an annular row of flyweights which are carried by said rotary casing, each being integral with a rotational axis parallel to said longitudinal axis and meshed with the synchronization ring.

9. The module according to claim 8, wherein the rotational axes of the flyweights are connected to pinions meshed with an annular toothing radially external to the synchronization ring.

10. The module according to claim 3, wherein the synchronization ring is connected to a blade feathering module via a frustoconical wall opposite the first frustoconical wall with respect to the substantially cylindrical wall.

11. The module according to claim 10, wherein the frustoconical walls and the substantially cylindrical wall at least partially accommodate the mechanism for varying the pitch.

12. The module according to claim 1, in which the reference body is axially offset with respect to the synchronization ring.

13. An aircraft turbomachine comprising at least one module according to claim 1.

14. A turbomachine module with a longitudinal axis, the module comprising:
- a rotary casing rotatable around the longitudinal axis and arranged to carry a propeller provided with a plurality of blades; and
- a system for changing the pitch of the blades of the propeller comprising:
  - a control, and
  - a variable pitch mechanism for varying the pitch of the blades of the propeller connecting these blades to the control,
- wherein said control comprises a rotary actuator comprising a control body and a reference body which is integral with said rotary casing, and wherein said variable pitch mechanism for varying the pitch comprises a synchronization ring which is driven in rotation around the longitudinal axis by said control body and which is guided in rotation on said rotary casing by a guide, said synchronization ring being intended to be connected to said blades, the rotary actuator being offset axially with respect to the synchronization ring
- wherein the synchronization ring comprises a substantially cylindrical wall connected to at least a first frustoconical wall and
- wherein the synchronization ring is connected to a blade feathering module via a frustoconical wall opposite the first frustoconical wall with respect to the substantially cylindrical wall.

15. A turbomachine module with a longitudinal axis, the module comprising:
- a rotary casing rotatable around the longitudinal axis and arranged to carry a propeller provided with a plurality of blades; and
- a system for changing the pitch of the blades of the propeller comprising:
  - a control, and
  - a variable pitch mechanism for varying the pitch of the blades of the propeller connecting these blades to the control,
- wherein said control comprises a rotary actuator comprising a control body and a reference body which is integral with said rotary casing, and wherein said variable pitch mechanism for varying the pitch comprises a synchronization ring which is driven in rotation around the longitudinal axis by said control body and which is guided in rotation on said rotary casing by a guide, said synchronization ring being intended to be connected to said blades, the rotary actuator being offset axially with respect to the synchronization ring,
- wherein the synchronization ring is connected to a blade feathering module comprising an annular row of flyweights which are carried by said rotary casing, each being integral with a rotational axis parallel to said longitudinal axis and meshed with the synchronization ring, and
- wherein the rotational axes of the flyweights are connected to pinions meshed with an annular toothing radially external to the synchronization ring.

* * * * *